United States Patent
Palazzo et al.

(10) Patent No.: US 6,759,164 B2
(45) Date of Patent: Jul. 6, 2004

(54) USE OF HEAT-TREATED ELECTRODES CONTAINING A POLYAMIC ACID-PVDF BINDER MIXTURE

(75) Inventors: Marcus Palazzo, Amherst, NY (US); Esther S. Takeuchi, East Amherst, NY (US)

(73) Assignee: Wilson Greatbatch Ltd., Clarence, NY (US)

(*) Notice: Subject to any disclaimer, the term of this patent is extended or adjusted under 35 U.S.C. 154(b) by 54 days.

(21) Appl. No.: 09/995,202

(22) Filed: Nov. 27, 2001

(65) Prior Publication Data

US 2002/0076611 A1 Jun. 20, 2002

Related U.S. Application Data

(60) Provisional application No. 60/253,972, filed on Nov. 29, 2000.

(51) Int. Cl.$^7$ .......................... H01M 4/62; H01M 4/58; H01M 4/88; C01G 33/00; H01B 1/12
(52) U.S. Cl. .................. 429/217; 429/231.2; 429/220; 429/219; 423/594.8; 252/182.1; 252/519.33
(58) Field of Search ................. 429/212, 217, 429/213, 231.5, 219, 220, 231.1, 231.2; 252/182.1, 520.3, 520.4, 519.33; 423/593.1, 594.8, 604; 428/435, 473.5

(56) References Cited

U.S. PATENT DOCUMENTS

| | | |
|---|---|---|
| 4,830,940 A | 5/1989 | Keister et al. |
| 5,004,777 A | 4/1991 | Hallden-Abberton et al. |
| 5,106,673 A | 4/1992 | Effenberger et al. |
| 5,264,483 A | 11/1993 | Hallden-Abberton et al. |
| 5,468,571 A | 11/1995 | Fujimoto et al. |
| 5,565,284 A | 10/1996 | Koga et al. |
| 5,959,022 A | 9/1999 | Lin et al. |
| 6,001,507 A * | 12/1999 | Ono et al. ............... 429/217 |
| 6,068,950 A | 5/2000 | Gan et al. |
| 6,180,282 B1 | 1/2001 | Nishida et al. |
| 6,566,007 B1 | 5/2003 | Takeuchi et al. |
| 2002/0098411 A1 | 7/2002 | Gam et al. |

FOREIGN PATENT DOCUMENTS

JP   H9-129240   5/1997

OTHER PUBLICATIONS

Hong Gan, Randolph A. Leising, Marcus Palazzo, Steven M. Davis, and Esther S. Takeuchi, The Effect of Binder Type on Li–Ion Electrode Performance, 15$^{th}$ International Seminar & Exhibit on Primary & Secondary Batteries, Mar. 1998, Fort Lauderdale, Floria, Wilson Greatbach Ltd., Clarence, NY 14031, USA.

* cited by examiner

Primary Examiner—Raymond Alejandro
(74) Attorney, Agent, or Firm—Michael F. Scalise

(57) ABSTRACT

A mixture of polymeric binders that is insoluble in non-aqueous organic electrolytes activating alkali metal or alkali metal ion electrochemical cells, is described. The mixed binder formulation provides electrodes that are flexible and non-brittle, and cells incorporating the electrodes are dischargeable at elevated temperatures. A preferred binder formulation is a mixture of polyvinylidene and polyimide binders.

26 Claims, 6 Drawing Sheets

USE OF HEAT-TREATED ELECTRODES CONTAINING A POLYAMIC ACID-PVDF BINDER MIXTURE

CROSS-REFERENCE TO RELATED APPLICATION

The present application claims priority based on U.S. provisional application Ser. No. 60/253,972, filed Nov. 29, 2000.

BACKGROUND OF THE INVENTION

1. Field of Invention

The present invention relates to the conversion of chemical energy to electrical energy, and more particularly to a mixture of polymeric binders for construction of an electrode intended for incorporation into an electrochemical cell. The preferred binder formulation is a mixture of a halogenated polymeric binder and a polymide binder, most preferably polyvinylidene fluoride (PVDF) and a polyimide. Electrodes built containing the mixed polymeric binders are useful in both primary and secondary cells discharged at elevated and low temperatures.

2. Prior Art

Halogenated polymeric materials have been used extensively as binders for electrodes in all types of nonaqueous electrochemical cells, and particularly lithium cells. For example, polyvinylidene fluoride is a material that functions well as an electrode active binder at or near ambient temperature. However, PVDF is soluble in organic electrolytes at elevated temperatures. Thus, cells manufactured with halogenated polymeric materials such as PVDF as the sole binder material cannot be used in high temperature applications or survive high temperature exposure, such as occurs in an autoclave, without severe degradation.

It is also known in the prior art to employ non-halogenated polymeric materials as binders in nonaqueous, alkali metal electrochemical cells. Exemplary is U.S. Pat. No. 5,468,571 to Asami et al. which discloses that polyimide (PI) is useful as an anode binder in lithium secondary cells. Electrodes containing such non-halogenated polymers as the sole binder material are somewhat brittle and have a tendency to crack.

U.S. Pat. No. 6,001,507 to Ono et al. describes electrodes for secondary cells prepared from a mixture of a soluble polyimide and PVDF combined with an active material such as $LiCoO_2$. The soluble polyimide is a material which is converted to the imide before it is mixed with the depolarizing active mixture. This is done to prevent water from entering the electrochemical system. However, fabricating an electrode with binders which are soluble in nonaqueous solvents hinders the active mixture/current collector contact interface, especially after repeated cycling.

Thus, there is a need for a binder formulation that is insoluble in both primary and secondary organic solvent electrolyte systems, particularly those used to activate alkali metal primary cells or alkali metal ion secondary cells, and is able to withstand high temperature exposure without compromising discharge efficiency.

SUMMARY OF THE INVENTION

The present invention is, therefore, directed to a mixture of two polymeric binders that are insoluble in nonaqueous organic electrolytes activating alkali metal and alkali metal ion electrochemical cells and that provide flexible, non-brittle electrodes dischargeable at elevated temperatures. The first binder is preferably a halogenated polymeric binder, and more preferably a fluorinated polymeric material, such as PVDF. The second binder is polyimide, and preferably one derived from a polyamic acid prior to activating the electrochemical couple. A preferred binder mixture is PVDF and PI. An electrode comprising such a binder mixture can serve as the cathode in a primary alkali metal electrochemical cell or as the negative electrode in a secondary cell, such as a lithium ion cell.

These and other objects of the present invention will become increasingly more apparent to those skilled in the art by reference to the following description and the appended drawings.

DETAILED DESCRIPTION OF THE INVENTION

Figure 1:
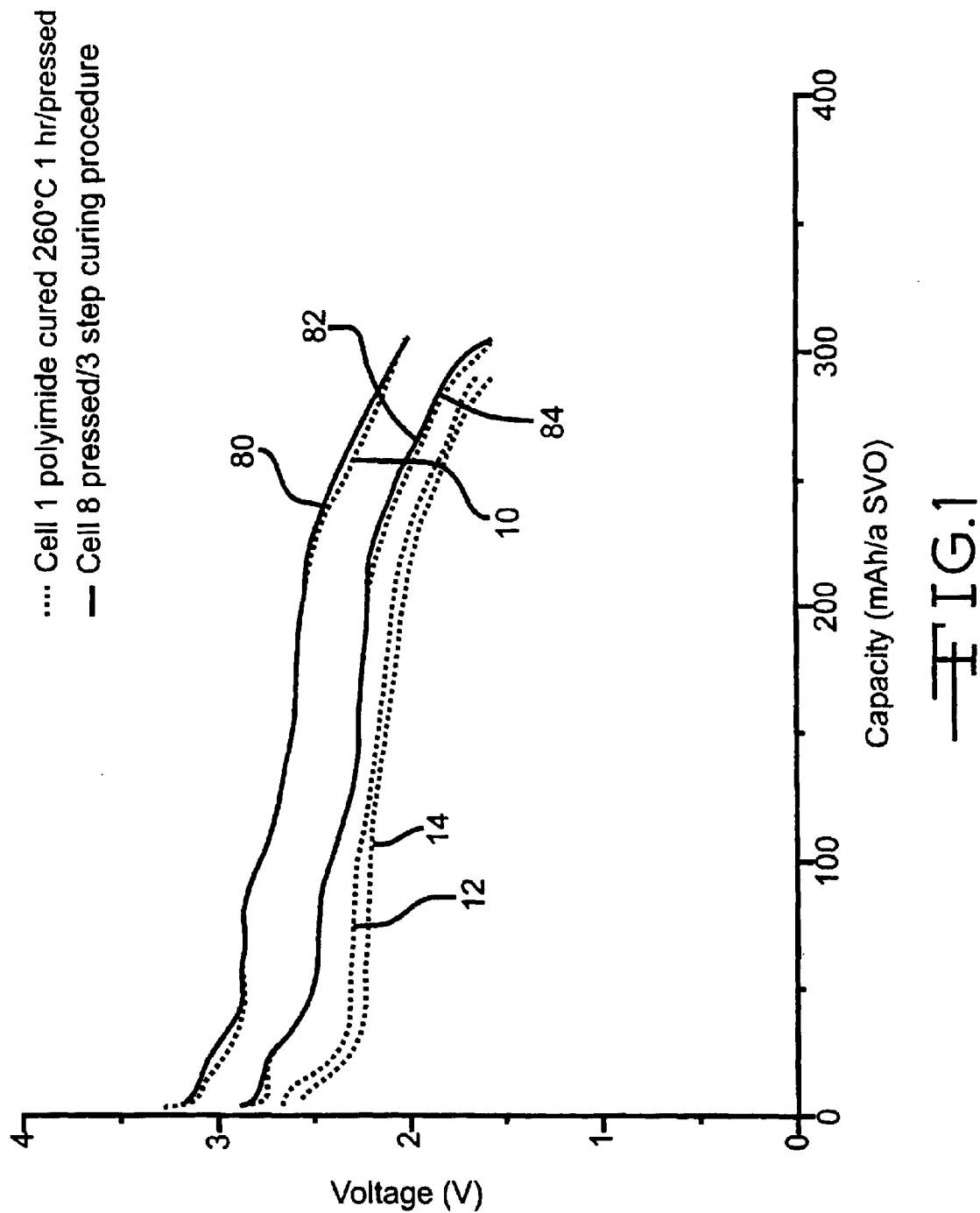
FIG. 1 is a graph comparing the pulse discharge results of two Li/SVO cells, one having a binder of polyamic acid conversion polyimide, the other of a binder mixture of polyamic acid conversion polyimide/PVDF pressed to the current collector before being heat cured.

The present invention is directed to the fabrication of electrodes for use in both primary and secondary electrochemical cells dischargeable at elevated temperatures, such as occur in downhole well drilling operations and in an autoclave, without diminished discharge performance in comparison to cells of a similar active chemistry discharged at or near ambient temperatures. For that purpose, the electrode active material intended as the cathode in a primary cell, or as the negative electrode in a secondary cell, is intimately combined with a binder mixture consisting of a first, halogenated polymeric constituent and a second, polyamic acid to form an electrode active admixture. If desired, a conductive diluent can also be added to the admixture to promote conductivity. Upon heating, the polyamic acid is converted to a polyimide. Preferably, the active mixture is pressed into intimate contact with a current collector prior to the conversion heating step.

Halogenated polymeric materials suitable as the first binder constituent are preferably fluorinated resins, for example, polytetrafluoroethylene, modified polytetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, polyvinylidene fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, and fluorinated polyallyloxysilane resins. The first binder constituent can also be a fluorinated elastomer such as vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, and flexible fluorocarbon resins. Any one of the fluorinated resins and fluorinated elastomers are suitable as the first, halogenated polymeric constituent when used alone or in mixtures thereof.

The second binder constituent is a polyimide derived from a polyamic acid precursor. In particular, the product polyimide is insoluble in nonaqueous solvents typically used as activating electrolytes for alkali metal and alkali metal ion-containing cells.

The content of the fluorinated polymer is not particularly limited, but is preferably at least 20%, by weight, of the mixture of the first and second binders. Less than 20% by weight of the fluorinated polymer constituent results in insufficient cohesion of the electrode active material during electrode fabrication and assembly of the cell, and during charge/discharge cycling.

A typical electrode for a nonaqueous, alkali metal electrochemical cell is made from a mixture of 80 to 95 weight percent of an electrode active material, 1 to 10 weight percent of a conductive diluent and 3 to 25 weight percent of a mixture of the polymeric binders according to the present invention comprising the first, halogenated polymeric constituent and the second, polyamic acid conversion polyimide constituent. The first binder is preferably used in a powdered form while the second binder is typically provided in a solvent slurry. Less than 3 weight percent of the binder mixture provides insufficient cohesiveness to the loosely agglomerated electrode active materials to prevent delamination, sloughing and cracking during electrode preparation and cell fabrication and during cell discharge. More than 25 weight percent of the binder mixture provides a cell with diminished capacity and reduced current density due to lowered electrode active density.

The above-described binder mixture is generally used by dissolving or dispersing the materials in respective powder and liquid acidic forms in a solvent, although the binder materials may sometimes be used without a solvent. Suitable solvents include water, methyl ethyl ketone, cyclohexanone, isophoron, N-methyl-2-pyrrolidone (NMP), N,N-dimethylformamide, N,N-dimethylacetamide, toluene, and mixtures thereof.

The most preferred binder formulation according to the present invention comprises a mixture of polyvinylidene fluoride (PVDF) as the first binder constituent and polyamic acid conversion polyimide (PI) as the second binder constituent. The preferred binder composition ranges from, by weight, about 1% PVDF:99% PI to about 99% PVDF:1% PI with a more preferred composition ranging from about 40% PVDF:60% PI to about 60% PVDF:40% PI, and most preferably about 50% PVDF to 50% PI. Suitable conductive diluents include acetylene black, carbon black and/or graphite. Metals such as nickel, aluminum, titanium and stainless steel in powder form are also useful as conductive diluents when mixed with the above listed active materials.

Whether the electrode is of a primary or a secondary chemistry, it is preferably first pressed into intimate contact with the current collector, then cured at a temperature of about 225° C. to about 275° C. for a period of about 30 minutes to about 2 hours. A more preferred curing protocol is to heat the electrode at about 260° C. for about 1 hour. Secondary cell negative electrodes must be cured under an argon atmosphere to prevent oxidation of the copper current collector.

An electrochemical cell constructed according to the present invention, whether of a primary or a secondary chemistry, includes an anode active material selected from Groups IA, IIA, or IIIB of the Periodic Table of Elements, including lithium, sodium, potassium, etc., and their alloys and intermetallic compounds including, for example Li—Si, Li—B, Li—Mg, and Li—Si—B alloys and intermetallic compounds. The preferred anode active material comprises lithium. For a primary cell, the preferred anode comprises a lithium alloy, the preferred lithium alloy being a lithium-aluminum alloy. The greater the amount of aluminum present by weight in the alloy, however, the lower the energy density of the cell.

In secondary electrochemical systems, a carbonaceous negative electrode is preferred. The carbon comprises any of the various forms of carbon (e.g., coke, graphite, acetylene black, carbon black, etc.) which are capable of reversibly retaining the lithium species. Graphite is preferred due to its relatively high lithium-retention capacity. Carbon fibers are particularly advantageous because they have excellent mechanical properties which permit them to be fabricated into rigid electrodes that are capable of withstanding degradation during repeated charge-discharge cycling. Moreover, their high surface area allows rapid charge/discharge rates. The carbon may be contacted to a conductive substrate such as by pressing, bonding, and the like. A preferred carbonaceous material for the negative electrode of a secondary electrochemical cell is described in U.S. Pat. No. 5,443,928 to Takeuchi et al., which is assigned to the assignee of the present invention and incorporated herein by reference.

A typical secondary cell negative electrode is fabricated by mixing about 90 to 97 weight percent graphite with 3 to 10 weight percent of the present invention mixture of a first, halogenated polymeric binder and a second, polyamic acid. This electrode active admixture in a viscous slurry form is rolled onto a current collector such as a nickel, stainless steel, or copper foil or screen.

The form of the anode or negative electrode may vary. For example, in a primary cell the anode is preferably a thin metal sheet or foil of the anode metal, pressed or rolled on a metallic anode current collector, i.e., preferably comprising nickel. The anode component further has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode or positive electrode of both a primary and a secondary cell is preferably of a solid, lithium retentive material and the electrochemical reaction at the cathode involves conversion of ions which migrate from the anode to the cathode in atomic or molecular forms. The solid cathode material may comprise a metal, a metal oxide, a mixed metal oxide, a metal sulfide or a carbonaceous compound, and combinations thereof. The metal oxide, the mixed metal oxide and the metal sulfide can be formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds.

One preferred mixed metal oxide useful as the cathode of a primary cell has the general formula $SM_xV_2O_y$, wherein SM is a metal selected from Groups IB to VIIB and VIII of the Periodic Table of Elements, and wherein x is about 0.30 to 2.0 and y is about 4.5 to 6.0 in the general formula. For a more detailed description of such a cathode active material, reference is made to U.S. Pat. No. 4,310,609 to Liang et al., which is assigned to the assignee of the present invention and incorporated herein by reference. Another preferred composite cathode active material for primary cells has the general formula $Cu_xAg_yV_2O_z$, (CSVO) and the range of material compositions is preferably about $0.01 \leq x \leq 1.0$, about $0.01 \leq y \leq 1.0$ and about $5.01 \leq z \leq 6.5$. For a more detailed description of this cathode active material, reference is made to U.S. Pat. No. 5,472,810 to Takeuchi et al. and U.S. Pat. No. 5,516,340 to Takeuchi et al., both of which are assigned to the assignee of the present invention and incorporated herein by reference.

One preferred electrochemical couple is of a lithium/silver vanadium oxide chemistry. In that case, the cathode is formed by adding PVDF to a polyamic acid/solvent slurry. This slurry is stirred to create a low viscosity mixture. Separately, dry SVO is milled with conductive additives to create a homogeneous mixture which is then mixed with the diluted binder slurry causing uniform coating of the SVO with the binder materials. Upon drying, the coated active material is pressed to provide greater SVO particle to particle contact. Pressing the cathode structure before curing also ensures that the active mixture is in close contact with the current collector substrate prior to conversion of the polyamic acid to the polyimide. The polyamic acid containing cathode structure is then heat cured to cross link the packed SVO together and in close contact with the substrate. Using a higher curing temperature increases the amount of polyimide cross linking which in turn allows less expansion of the SVO and, consequently, less delamination from the current collector substrate.

Other cathode active materials useful for fabrication of primary cells include manganese dioxide, copper vanadium oxide, titanium disulfide, copper oxide, copper sulfide, iron sulfide, iron disulfide, fluorinated carbon, and mixtures thereof. Preferably, the cathode comprises from about 80 to about 99 weight percent of the cathode active material.

Additionally, a primary electrochemical cell can comprise a liquid depolarizer/catholyte, such as sulfur dioxide or oxyhalides including phosphoryl chloride, thionyl chloride and sulfuryl chloride used individually or in combination with each other or in combination with halogens and interhalogens, such as bromine trifluoride, or other electrochemical promoters or stabilizers. This type of cell requires a carbonaceous cathode current collector containing a binder mixture according to the present invention.

In secondary cells, the cathode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$. Because conversion of polyamic acid to a polyimide results in hydrous by-products, these materials are not useful with the binder mixture of the present invention.

To discharge such secondary cells, the lithium metal comprising the positive electrode is intercalated into the carbonaceous negative electrode by applying an externally generated electrical potential to recharge the cell. The applied recharging electrical potential serves to draw the alkali metal ions from the cathode active material, through the electrolyte and into the carbonaceous anode material comprising the negative electrode. The cell is then provided with an electrical potential and discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, titanium disulfide, copper oxide, copper sulfide, iron sulfide, iron disulfide and fluorinated carbon. This approach is compromised by the problems associated with handling lithiated carbon outside of the cell. Lithiated carbon tends to react with explosive results when contacted by air. However, since these materials do not contain lithium ions, there are useful active materials with the present binder mixture. Upon the subsequent heat curing, the polyamic acid is converted to the polyimide and the reaction water is evaporated.

Whether the cell is constructed as a primary or secondary electrochemical system, a separator is provided to physically segregate the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Suitable nonaqueous electrolytes comprise an inorganic salt dissolved in a nonaqueous solvent, and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous solvents are substantially inert to the anode and cathode electrode materials and preferred low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonate (MEC), methyl propyl carbonate (MPC), ethyl propyl carbonate (EPC), 1,2-dimethoxyethane (DME), and mixtures thereof. Preferred high permittivity solvents include propylene carbonate (PC), ethylene carbonate (EC), butylene carbonate (BC), acetonitrile, dimethyl sulfoxide, dimethyl formamide, dimethyl acetainide, y-butyrolactone (GBL), y-valerolactone, N-methyl-pyrrolidinone (NMP), and mixtures thereof.

Known lithium salts that are useful as a vehicle for transport of alkali metal ions from the anode to the cathode, and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiNO_3$, $LiO_2CCF_3$, $LiN(SO_2CF_3)_2$, $LiSCN$, $LiO_3SCF_2CF_3$, $LiC_6F_5SO_3$, $LiO_2CF_3$, $LiSO_3F$, $LiB(C_6H_5)_4$, $LiCF_3SO_3$, and mixtures thereof. Suitable salt concentrations typically range between about 0.8 to 1.5 molar.

The assembly of the cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The following examples describe the manner and process of an electrochemical cell according to the present invention, and they set forth the best mode contemplated by the inventors of carrying out the invention, but they are not to be construed as limiting.

EXAMPLE I

A powder mixture consisting essentially of, by weight, 94% SVO and 3% carbonaceous diluent was dry milled until a homogenous mixture was obtained. A mixture of, by weight, 7.1% polyamic acid/NMP slurry (3% solids dry) was added to the active admixture and stirred at low shear for 15 minutes. The active slurry was then coated onto an aluminum foil at a thickness of about 0.002 inches using a doctor blade. Upon drying, the cathode was cured at about 260° C. for about one hour then pressed at about 3 tons/cm$^2$. This cathode active structure was subsequently incorporated into Cell 1 (FIG. 1).

EXAMPLE II

Figure 2:
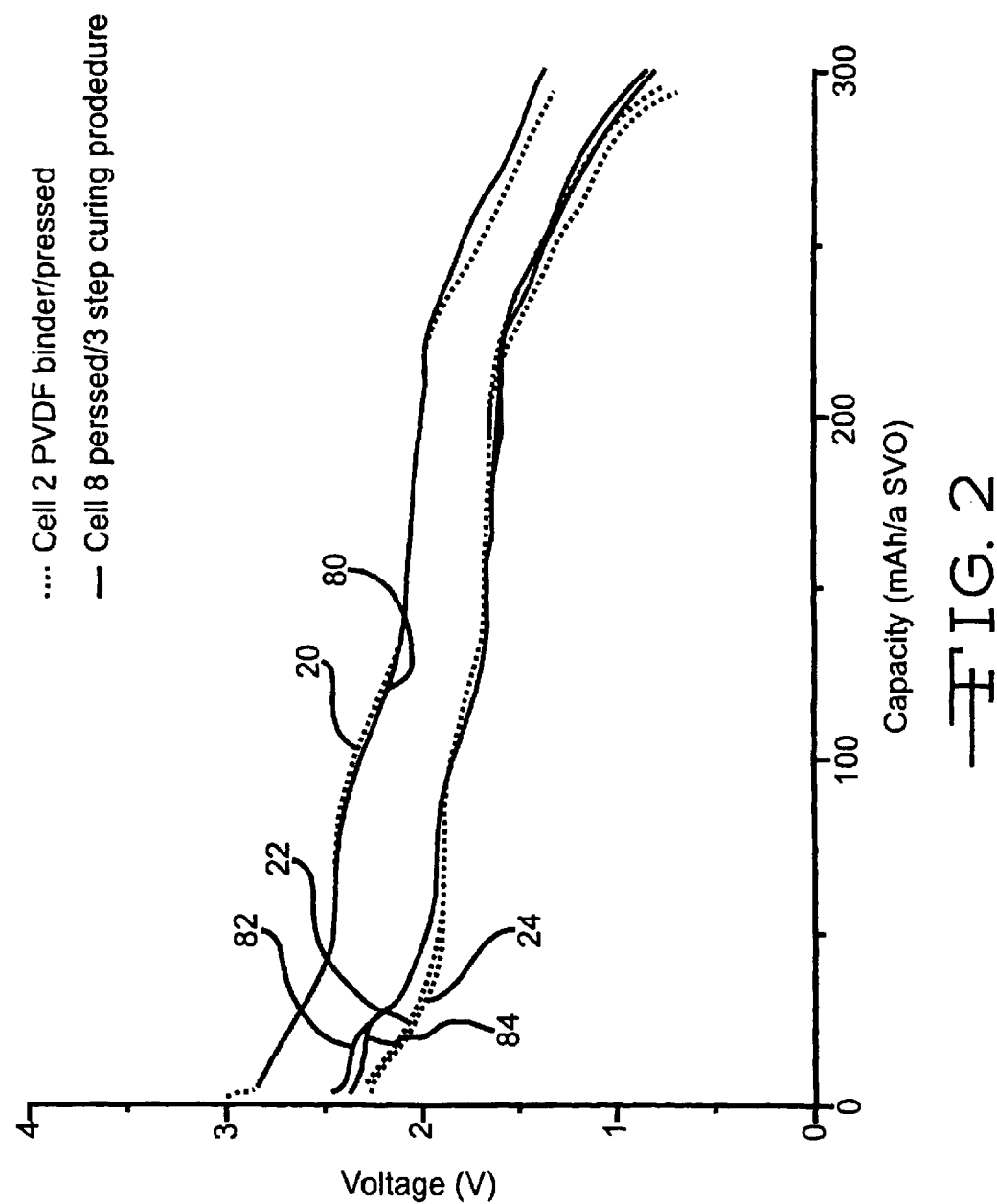
FIG. 2 is a graph comparing the pulse discharge results of two Li/SVO cells, one having a binder of PVDF, the other of a binder mixture of polyamic acid conversion polyimide/PVDF pressed to the current collector before being heat cured.

A powder mixture consisting essentially of, by weight, 94% SVO and 3% carbonaceous diluent was dry milled until a homogeneous mixture was obtained. A mixture of, by weight, 6.1% PVDF/DMF slurry (3% solids dry) was added to the active admixture and stirred at low shear for 15 minutes. The active slurry was then coated onto an aluminum foil at a thickness of about 0.001 inches using a doctor blade. Upon drying, the cathode was pressed at about 3 tons/cm$^2$. This cathode active structure was subsequently incorporated into Cell 2 (FIG. 2).

EXAMPLE III

Figure 3:
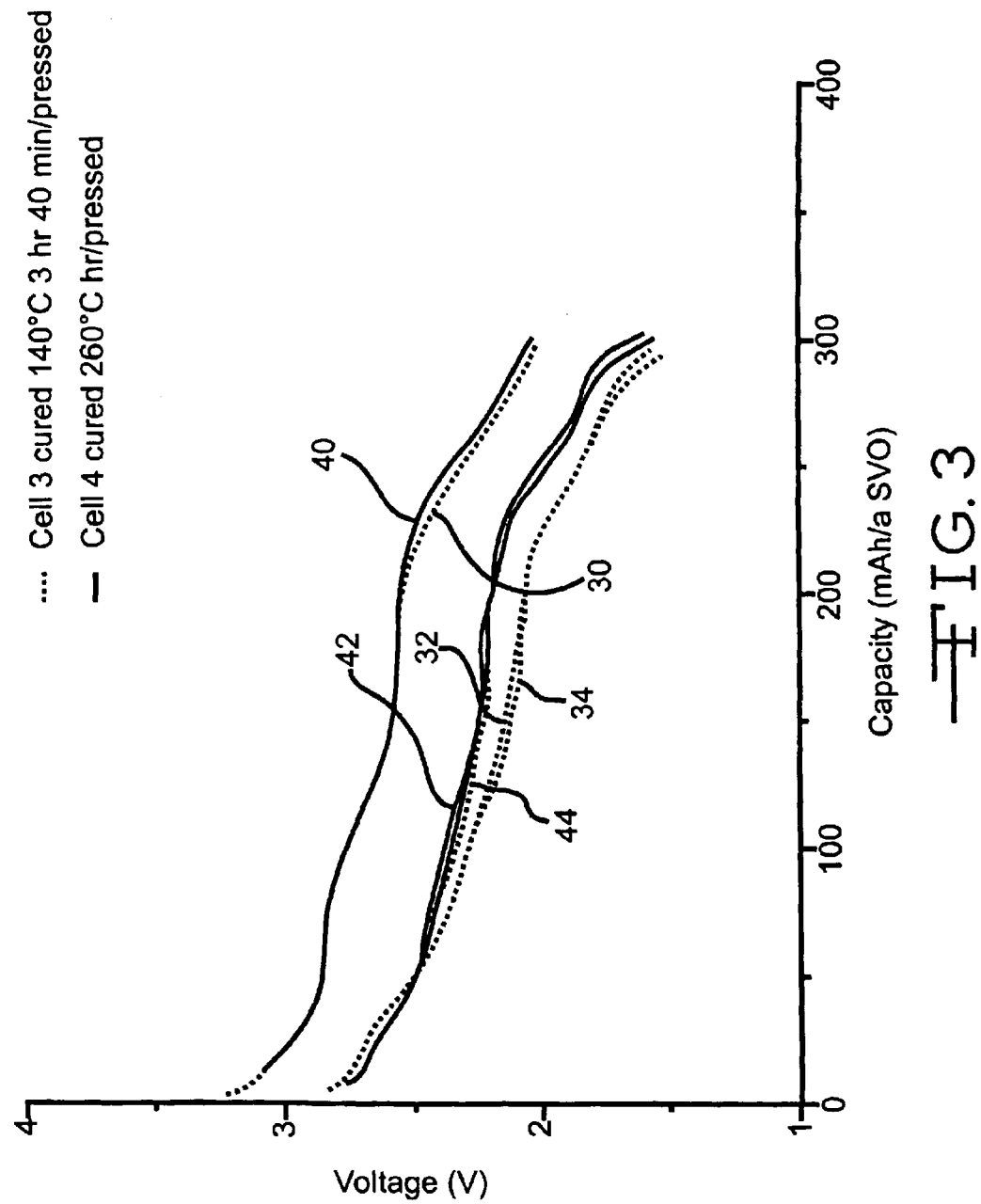
FIG. 3 is a graph comparing the pulse discharge results of two Li/SVO cells, both having a binder mixture of polyamic acid conversion polyimide/PVDF, and heat cured at different temperatures before being pressed to the current collector.
Figure 4:
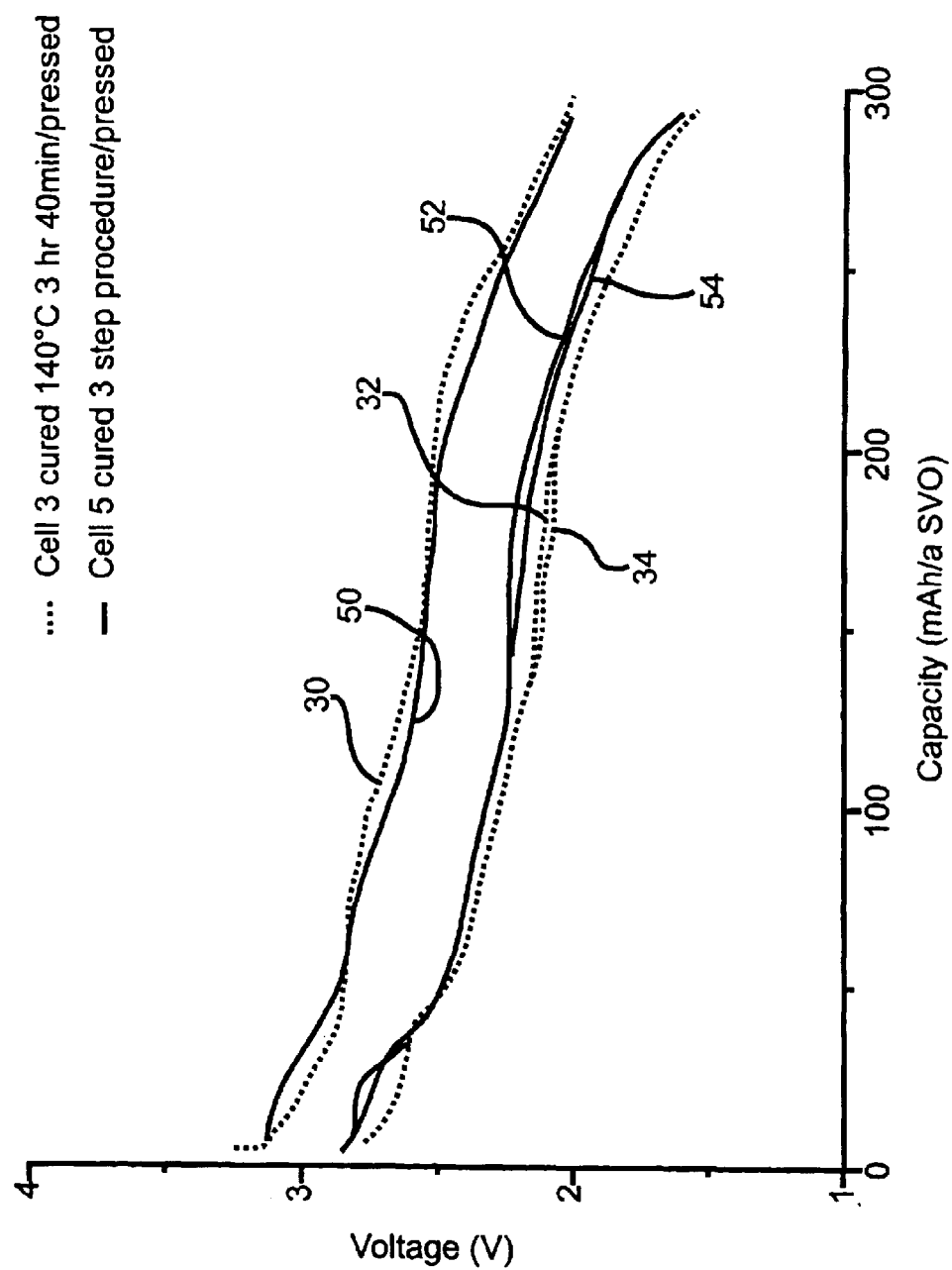
FIG. 4 is a graph comparing the pulse discharge results of two Li/SVO cells, both having a binder mixture of polyamic acid conversion polyimide/PVDF, and heat cured at different temperatures before being pressed to the current collector.
Figure 5:
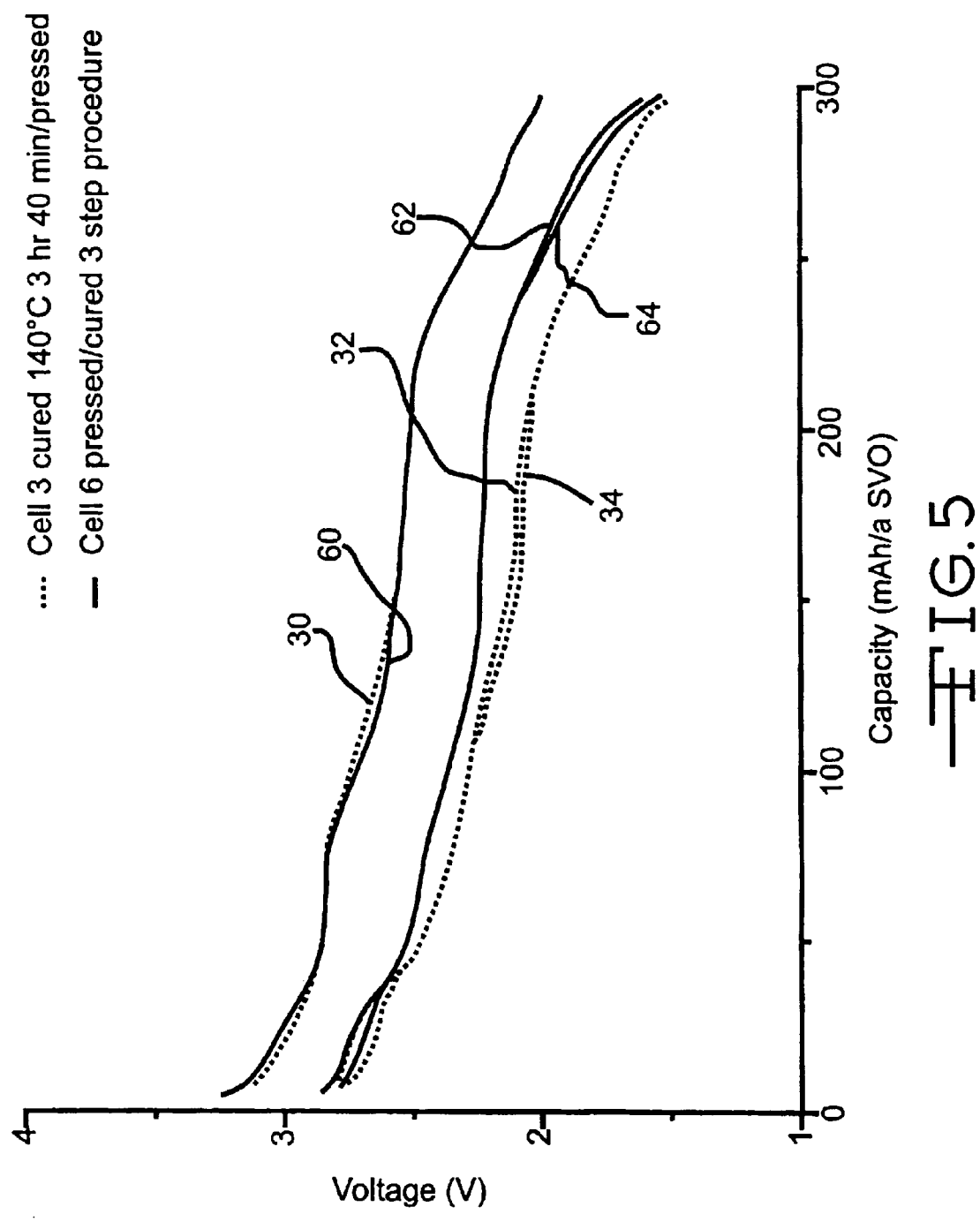
FIG. 5 is a graph comparing the pulse discharge results of two Li/SVO cells, both having a binder mixture of polyamic acid conversion polyimide/PVDF, and one heat cured before being pressed to the current collector, the other pressed before being cured.

A binder slurry of, by weight, 4% polyamic acid/1% PVDF in NMP was prepared at a concentration of 8% solids. The slurry was mixed at low shear for 15 minutes. A powder mixture consisting essentially of, by weight, 94% SVO and 3% carbonaceous diluent was dry milled until a homogenous was obtained. The milled solids were then added to the previously prepared binder slurry with a second low shear mixing step for ten minutes. The resulting active slurry was then coated onto an aluminum foil at a thickness of about 0.002 inches using a doctor blade. Upon drying, the cathode was cured at about 140° C for about three hours, 40 minutes, then pressed at about 3 tons/cm$^2$. This cathode active structure was subsequently incorporated into Cell 3 (FIGS. 3 to 5).

EXAMPLE IV

A binder slurry of, by weight, 4% polyamic acid/1% PVDF in NMP was prepared at a concentration of 8% solids. The slurry was mixed at low shear for 15 minutes. A powder mixture consisting essentially of, by weight, 94% SVO and 3% carbonaceous diluent was dry milled until a homogenous mixture was obtained. The milled solids were then added to the previously prepared binder slurry with a second low shear mixing step for ten minutes. The resulting active slurry was then coated onto an aluminum foil at a thickness of about 0.002 inches using a doctor blade. Upon drying, the cathode was cured at about 260° C for about two hours, then pressed at about 3 tons/cm$^2$. This cell active structure was subsequently incorporated into Cell 4 (FIG. 3).

EXAMPLE V

Figure 6:
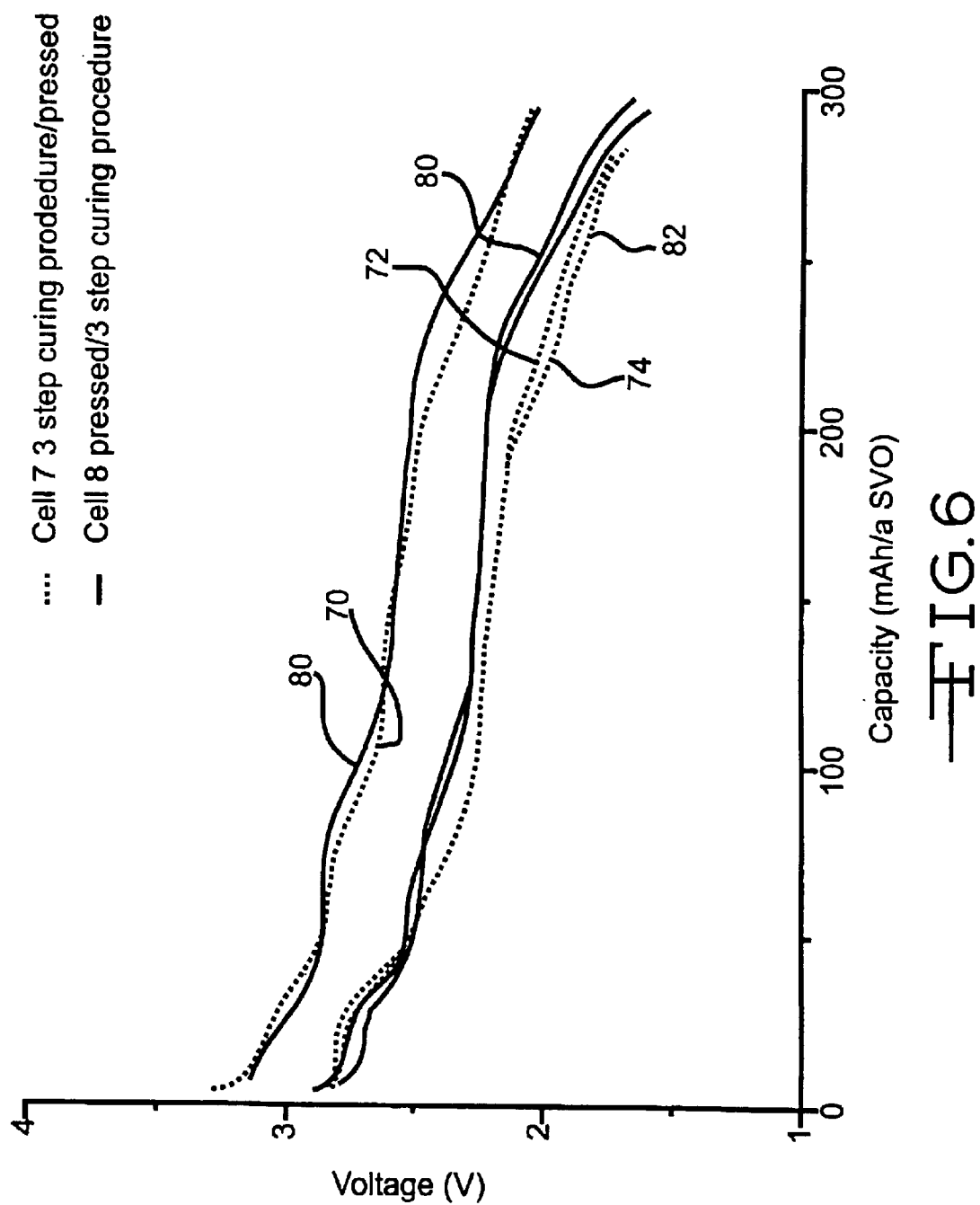
FIG. 6 is a graph comparing the pulse discharge results of two Li/SVO cells, both having a binder mixture of polyamic acid conversion polyimide/PVDF, and one heat cured before being pressed to the current collector, the other pressed before being cured.

A binder slurry of, by weight, 4% polyamic acid/1% PVDF in NMP was prepared at a concentration of 8% solids. The slurry was mixed at low shear for 15 minutes. A powder mixture consisting essentially of, by weight, 94% SVO and 3% carbonaceous diluent was dry milled until a homogenous mixture was obtained. The milled solids were then added to the previously prepared binder slurry with a second low shear mixing step for ten minutes. The resulting active slurry was then coated onto an aluminum foil at a thickness of about 0.002 inches using a doctor blade. Upon drying, the resulting cathode was cured according to the following protocol: about 140° C. for about 30 minutes, then about 200° C. for about 30 minutes, and finally about 350° C. for about one hour, then pressed at about 3 tons/cm$^2$. This cathode active structure was subsequently incorporated into Cell 5 (FIG. 4) and Cell 7 (FIG. 6).

EXAMPLE VI

A binder slurry of, by weight, 4% polyamic acid/1% PVDF in NMP was prepared at a concentration of 8% solids. The slurry was mixed at a low shear for 15 minutes. A powder mixture consisting essentially of, by weight, 94% SVO and 3% carbonaceous diluent was dry milled until a homogeneous mixture was obtained. The milled solids were then added to the previously prepared binder slurry with a second low shear mixing step for ten minutes. The resulting active slurry was then coated onto an aluminum foil at a thickness of about 0.002 inches using a doctor blade. Upon drying, the cathode was pressed at about 3 tons/cm$^2$, then cured according to the following protocol: about 140° C. for about 30 minutes, about 200° C. for about 30 minutes, and about 350° C. for about one hour. This cathode active structure was subsequently incorporated into Cell 6 (FIG. 5) and Cell 8 (FIGS. 1, 2 and 6).

Electrochemical Testing of Cathodes:

Coin cells were assembled comprising a lithium metal anode and a cathode punched from the above described active structures to provide an active area of approximately 2 cm² for each cell. The activating electrolyte was 1M LiAsF₆ dissolved in PC/DME=1:1.

The cells were first discharged at 0.5 mA to remove approximately 1% of their calculated total capacity. This is referred to as cell burn-in. The cells were then pulse discharged using a series of four 269 mA/g of SVO pulses of 10 second duration followed by a 15 second rest period between each pulse. After this pulse train, the cells were rested at open circuit voltage for thirty minutes followed by another four pulse/rest pulse train. This protocol was repeated until cell voltage reached 1.5 V.

FIG. 1 is a graph illustrating the pulse discharge of Cell 1 wherein curve 10 is the background voltage, curve 12 is the pulse 1 minima voltage (P1 min.) and curve 14 is the pulse 4 minima voltage (P4 min.) and of Cell 8, wherein curve 80 is the background voltage, curve 82 is the P1 min. and curve 84 is the P4 min. In FIG. 2, curve 20 is the background voltage of Cell 2, curve 22 is the P1 min. and curve 24 is the P4 min., and curves 80, 82 and 84 are those of Cell 8. In FIG. 3, curve 30 is the background voltage of Cell 3, curve 32 is the P1 min. and curve 34 is the P4 min., and curve 40 is the background voltage of Cell 4, curve 42 is the P1 min. and curve 44 is the P4 min. In FIG. 4, curves 30, 32 and 34 are those of Cell 3 while curve 50 is the background voltage of Cell 5, curve 52 is the P1 min. and curve 54 is the P4 min. In FIG. 5, curve 30, 32 and 34 are those of Cell 3 while curve 60 is the background voltage of Cell 6, curve 62 is the P1 min. and curve 64 is the P4 min. Finally, in FIG. 6, curve 70 is the background voltage of Cell 7, curve 72 is the P1 min. and curve 74 is the P4 min., and curves 80, 82 and 84 are those of Cell 8.

FIGS. 3 to 5 show the effect of curing temperatures on final pulse minimum voltages of cathodes containing the PVDF/polyamic acid conversion polyimide binder mixture of the present invention. Cathodes cured at higher temperatures displayed higher P1 and P4 minimum voltages as those of Cells 4 and 5 are higher than those of Cell 3. More importantly, in FIGS. 5 and 6, the order in which the cathode was pressed and cured resulted in a substantial pulse voltage difference. Cathodes pressed prior to the three step curing procedure (Cells 6 and 8) displayed a much higher pulse minimum voltage than those which were cured then pressed (Cells 5 and 7).

FIGS. 1 and 2 plot the pulse discharge performance of cathodes prepared with pure polyimide or pure PVDF binders, respectively. Voltage data from Cell 8, which contained a "pressed prior to cured" PVDF/polyimide cathode is overlaid as a comparison. The higher voltage improvement over that of a cathode having pure polyimide is shown in FIG. 1. In FIG. 2, the pulse voltage data of Cell 8 closely mimics the results obtained from Cell 2 having a cathode containing pure PVDF. The higher pulse minimum voltage of PVDF and PVDF/polyimide mixture cathodes is believed to be due to the greater flexibility of these electrodes, resulting in less cracking, and hence lower resistance, of the cathode active coating contacted to the current collector. Furthermore, it was noted that the cathode active coating containing pure PVDF (Cell 2) became completely delaminated following pulse discharge. Partial delamination could be seen upon filling with electrolyte prior to testing.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, which comprises:
 a) a negative electrode;
 b) a positive electrode comprising an electrode active material selected from one of the group:
  i) a first electrode active material having the general formula $SM_xV_2O_y$, wherein SM is a metal selected from Groups IB to VIIB and VIII of the Periodic Table of Elements, and wherein x is about 0.30 to 2.0 and y is about 4.5 to 6.0 in the general formula; and
  ii) a second electrode active material having the general formula $Cu_xAg_yV_2O_z$, wherein about $0.01 \leq x \leq 1.0$, about $0.01 \leq y \leq 1.0$ and about $5.01 \leq z \leq 6.5$;
 c) wherein the positive electrode includes at least a halogenated polymeric material as a first binder and a polyimide as a second binder, the positive electrode characterized as having been formed by first mixing the electrode active material with the first binder and a polyamic acid precursor of the second binder to form an electrode active admixture that is then contacted to a current collector followed by curing at a temperature of at least about 140° C. to convert the polyamic acid to the polyimide second binder and drive off water resulting from the conversion of the polyamic acid to the polyimide; and
 d) an electrolyte activating the negative and positive electrodes.

2. The electrochemical cell of claim 1 as either a primary or a secondary cell.

3. The electrochemical cell of claim 1 wherein a halogen of the halogenated polymeric material is fluorine.

4. The electrochemical cell of claim 1 wherein the first binder is selected from the group consisting of polytetrafluoroethylene, modified polytetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, polyvinylidene fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, fluorinated polyallyloxysilane resins, vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers and flexible fluorocarbon resins, and mixtures thereof.

5. The electrochemical cell of claim 1 wherein the ratio of the first binder to the second binder is, by weight, about 1:99 to about 99:1.

6. The electrochemical cell of claim 1 wherein the ratio of the first binder to the second binder is, by weight, about 40:60 to about 60:40.

7. The electrochemical cell of claim 1 wherein the first binder is polyvinylidene fluoride.

8. The electrochemical cell of claim 1 wherein the cell is a lithium ion cell.

9. The electrochemical cell of claim 1 wherein the positive electrode is characterized as having been cured at a temperature of about 225° C. to about 275° C. for about 30 minutes to about 2 hours prior to being contacted by the electrolyte.

10. The electrochemical cell of claim 1 wherein electrode active material is silver vanadium oxide.

11. The electrochemical cell of claim 1 wherein the electrode active admixture is press contacted to the current collector at a pressure of about 3 tons/cm$^2$.

12. The electrochemical cell of claim 1 wherein at least one of the negative electrode and the positive electrode either comprises an alkali metal or the alkali metal is intercalatable into the electrode active material.

13. The electrochemical cell of claim 1 wherein the polyimide is insoluble in the electrolyte.

14. The electrochemical cell of claim 1 wherein the electrolyte comprises an inorganic salt dissolved in at least one aprotic organic solvent.

15. The electrochemical cell of claim 14 wherein the electrolyte comprises a low viscosity solvent selected from the group consisting of an ester, an ether, a dialkyl carbonate, and mixtures thereof, and a high permittivity solvent selected from the group consisting of a cyclic carbonate, a cyclic ester, a cyclic amide, and mixtures thereof.

16. The electrochemical cell of claim 15 wherein the low viscosity solvent is selected from the group consisting of tetrahydrofuran, methyl acetate, diglyme, triglyme, tetraglyme, dimethyl carbonate, diethyl carbonate, dipropyl carbonate, methyl ethyl carbonate, methyl propyl carbonate, ethyl propyl carbonate, 1,2-dimethoxyethane, and mixtures thereof, and the high permittivity solvent is selected from the group consisting of propylene carbonate, ethylene carbonate, butylene carbonate, acetonitrile, dimethyl sulfoxide, dimethyl formamide, dimethyl acetamide, y-butyrolactone, y-valerolactone, N-methyl-pyrrolidinone, and mixtures thereof.

17. The electrochemical cell of claim 14 wherein the inorganic salt is selected from the group consisting of LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiO$_2$, LiNO$_3$, LiO$_2$CCF$_3$, LiN(SO$_2$CF$_3$)$_2$, LiSCN, LiO$_3$SCF$_2$CF$_3$, LiC$_6$F$_5$SO$_3$, LiO$_2$CF$_3$, LiSO$_3$F, LiB(C$_6$H$_5$)$_4$, LiCF$_3$SO$_3$, and mixtures thereof.

18. An electrode for an electrochemical cell, the electrode comprising:
   a) an electrode active material selected from one of the group:
      i) a first electrode active material having the general formula SM$_x$V$_2$O$_y$, wherein SM is a metal selected from Groups IB to VIIB and VIII of the Periodic Table of Elements, and wherein x is about 0.30 to 2.0 and y is about 4.5 to 6.0 in the general formula; and
      ii) a second electrode active material having the general formula Cu$_x$Ag$_y$V$_2$O$_z$, wherein about $0.01 \leq x \leq 1.0$, about $0.01 \leq y \leq 1.0$ and about $5.01 \leq z \leq 6.5$;
   b) a halogenated polymeric material as a first binder; and
   c) a polyimide as a second binder, the electrode characterized as having been formed by first mixing the electrode active material with the first binder and a polyamic acid precursor of the second binder to form an electrode active admixture that is then press contacted to a current collector followed by curing at a temperature of at least about 140° C. to convert the polyamic acid to the polyimide second binder and drive off water resulting from the conversion of the polyamic acid to the polyimide.

19. The electrode of claim 18 wherein a halogen of the halogenated polymeric material is fluorine.

20. The electrode of claim 18 wherein the first binder is selected from the groups consisting of polytetrafluoroethylene, modified polytetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, polyvinylidene fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, fluorinated polyallyloxysilane resins, vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers and flexible fluorocarbon resins, and mixtures thereof.

21. The electrode of claim 18 wherein the ratio of the first binder to the second binder is, by weight, about 1:99 to 99:1.

22. The electrode of claim 18 wherein the ratio of the first binder to the second binder is, by weight, about 40:60 to about 60:40.

23. The electrode of claim 18 wherein the first binder is polyvinylidene fluoride.

24. The electrode of claim 18 wherein the ratio of the first binder to the second binder is, by weight, about 50:50.

25. The electrode of claim 18 characterized as having been cured at a temperature of about 225° C. to about 275° C. for about 30 minutes to about 2 hours.

26. The electrode of claim 18 wherein the electrode active admixture comprises silver vanadium oxide press contacted to the current collector at a pressure of about 3 tons/cm$^2$.

* * * * *

UNITED STATES PATENT AND TRADEMARK OFFICE
CERTIFICATE OF CORRECTION

PATENT NO. : 6,759,164 B2
DATED : July 6, 2004
INVENTOR(S) : Marcus Palazzo et al.

It is certified that error appears in the above-identified patent and that said Letters Patent is hereby corrected as shown below:

Column 6,
Line 64, "y-butyrolactone (GBL); y-valerolactone" should read -- "$\gamma$-butyrolactone (GBL), $\gamma$-valerolactone --;

Column 10,
Line 11, "$Cu_xAg_yV_2O_x$" should read -- $Cu_xAg_yV_2O_z$ --;

Column 11,
Line 29, "y-butyrolactone, y-valerolactone" should read -- "$\gamma$-butyrolactone, $\gamma$-valerolactone --; and
Line 47, "$Cu_xAg_yV_2O_x$" should read -- $Cu_xAg_yV_2O_z$ --.

Signed and Sealed this

Sixteenth Day of November, 2004

JON W. DUDAS
*Director of the United States Patent and Trademark Office*